US007391932B2

(12) United States Patent
Jeon

(10) Patent No.: US 7,391,932 B2
(45) Date of Patent: Jun. 24, 2008

(54) APPARATUS AND METHOD FOR SELECTING IMAGE TO BE DISPLAYED

(75) Inventor: Jong-gu Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 10/383,863

(22) Filed: Mar. 10, 2003

(65) Prior Publication Data

US 2004/0012608 A1 Jan. 22, 2004

(30) Foreign Application Priority Data

Jul. 16, 2002 (KR) ...................... 10-2002-0041582

(51) Int. Cl.
*G06K 9/32* (2006.01)

(52) U.S. Cl. ........................ 382/298; 382/293; 382/305; 358/1.2; 358/523

(58) Field of Classification Search ................. 382/166, 382/293, 295, 298, 282, 299, 165, 305; 358/1.2, 358/528, 451, 523, 444
See application file for complete search history.

(56) References Cited

U.S. PATENT DOCUMENTS 5,629,854 A * 5/1997 Schulte ....................... 701/207
5,694,560 A * 12/1997 Uya et al. ................... 715/781
5,694,585 A * 12/1997 Dwin et al. ................. 345/559
5,910,805 A * 6/1999 Hickey et al. ............... 345/467
5,986,676 A * 11/1999 Dwin et al. ................. 345/544
6,175,663 B1 * 1/2001 Huang ........................ 382/284
6,211,913 B1 * 4/2001 Hansen et al. .............. 348/239
6,366,316 B1 * 4/2002 Parulski et al. .............. 348/239
6,570,612 B1 * 5/2003 Saund et al. ............. 348/218.1

* cited by examiner

*Primary Examiner*—Yosef Kassa
(74) *Attorney, Agent, or Firm*—Sughrue Mion, PLLC

(57) ABSTRACT

Provided are an apparatus and method for selecting one of an image signal input from an image signal inputting device and an image signal obtained by changing the size of the image signal input from the image signal inputting device and displaying the selected image signal on a display device. The apparatus includes an image size converter for changing the size of a first image signal and outputting the result as a second image signal; and a selector for receiving the first and second image signals and selectively outputting one of the first and second image signals in response to a first control signal. With the apparatus and method, it is possible to selectively reproduce a high-definition image and a low-definition image.

32 Claims, 7 Drawing Sheets

APPARATUS AND METHOD FOR SELECTING IMAGE TO BE DISPLAYED

BACKGROUND OF THE INVENTION

This application claims the priority of Korean Patent Application No. 2002-41582, filed Jul. 16, 2002 in the Korean Intellectual Property Office, which is incorporated herein in its entirety by reference.

1. Field of the Invention

The present invention relates to the field of image signal reproduction, and more particularly, to an apparatus and method for selecting an image to be displayed by which one of an image signal input from an image signal inputting device and an image signal obtained by rescaling the image signal input from the image signal inputting device is selectively displayed on a display device of a system that preprocesses input digital image data.

2. Description of the Related Art

Conventionally, in order to encode an image signal input from a camera to be transmitted to or stored in a certain device, a portable display apparatus having an image reproduction device, such as a PDA (personal digital assistant) or a web pad, preprocesses the image signal, e.g., it downscales to convert the format of a color signal or change the size of an image signal. After preprocessing, an image signal input from a camera can be reproduced by a display apparatus and displayed on a screen to be appreciated by a user.

Meanwhile, general image display systems process data to produce images of fixed sizes, and therefore, the size of an image provided by a camera is determined. Thus, it is impossible for a user to reproduce images of various sizes using a general display apparatus.

Also, in a case where the size of an image input from a camera is very large, a bandwidth of a bus becomes exhausted. However, when a system clock frequency is increased to solve this problem, high power consumption, which is highly undesirable in portable display apparatuses, is unavoidable.

SUMMARY OF THE INVENTION

To solve the above problems, it is one aspect of the present invention to provide an apparatus and method for selecting an image signal to be displayed, through which one of an image signal input from an image signal inputting device and an image signal obtained by changing the size of the image signal input from the image signal inputting device is selectively displayed on a display device.

It is another aspect of the present invention to provide an apparatus and method for selecting an image signal to be displayed, through which an image signal input from an image signal inputting device, and an image signal obtained by changing the size of the image signal input from the image signal inputting device is selectively reproduced in an image signal preprocessing system with a double bus structure where one bus compresses an image and another bus displays an image.

To achieve one aspect of the present invention, there is provided an apparatus for selecting an image to be displayed, the apparatus including an image size converter for changing the size of a first image signal and outputting the result as a second image signal, and a selector for receiving the first and second image signals and selectively outputting one of the first and second image signals in response to a first control signal.

To achieve one aspect of the present invention, there is also provided a method for selecting an image signal to be displayed, the method including (a) changing the size of a first image signal and outputting the result as a second image signal, the first image signal being an input image signal, and (b) selecting one of the first and second image signals.

To achieve another aspect of the present invention, there is provided an apparatus for selecting an image signal having a double bus structure, the apparatus including an image size converter for changing the size of a first image signal and outputting the result as a second image signal, the first image signal being an input image signal of a certain size; a selector for receiving the first and second image signals and selectively outputting one of the first and second image signals in response to a first control signal; a system bus buffer including a first Y buffer, a first Cb buffer, and a first Cr buffer for receiving the second image signal and buffering a Y image signal, a Cb image signal, and a Cr image signal, which constitute the second image signal, respectively; a system bus for sending an input image signal to an image encoding unit; a system bus DMA unit for reading an image signal output from the system bus buffer and sending the result to the system bus; a display bus buffer including a second Y buffer, a second Cb buffer, and a second Cr buffer, the second Y, Cb, and Cr buffers for receiving the image signal output from the selector and buffering a Y image signal, a Cb image signal, and a Cr image signal, which constitute the image signal output from the selector, respectively; a display bus for sending an input image signal to an image encoding unit; and a display bus DMA unit for reading an image signal output from the display bus buffer and sending the result to the display bus.

To achieve another aspect of the present invention, there is also provided a method for selecting an image signal to be displayed, performed by an apparatus for selectively reproducing an image signal having a double bus structure, the method including (a) changing the size of a first image signal and outputting the result as a second image signal, the first image signal being an input image signal; (b) selecting one of the first and second image signals; (c) receiving the second image signal and buffering a Y image signal, a Cb image signal, and a Cr image signal, which constitute the second image signal, in a first Y buffer, a first Cb buffer, and a first Cr buffer, respectively; (d) reading image signals from the first Y, Cb, and Cr buffers and sending the results to a system bus, using a system bus DMA unit; (e) receiving the first or second image signal selected in (b) and buffering a Y image signal, a Cb image signal, and a Cr image signal, which constitute the selected first or second image signal in a second Y buffer, a second Cb buffer, and a second Cr buffer, respectively; and (f) reading image signals from the second Y, Cb, and Cr buffers and sending the results to a display bus, using a display bus DMA unit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
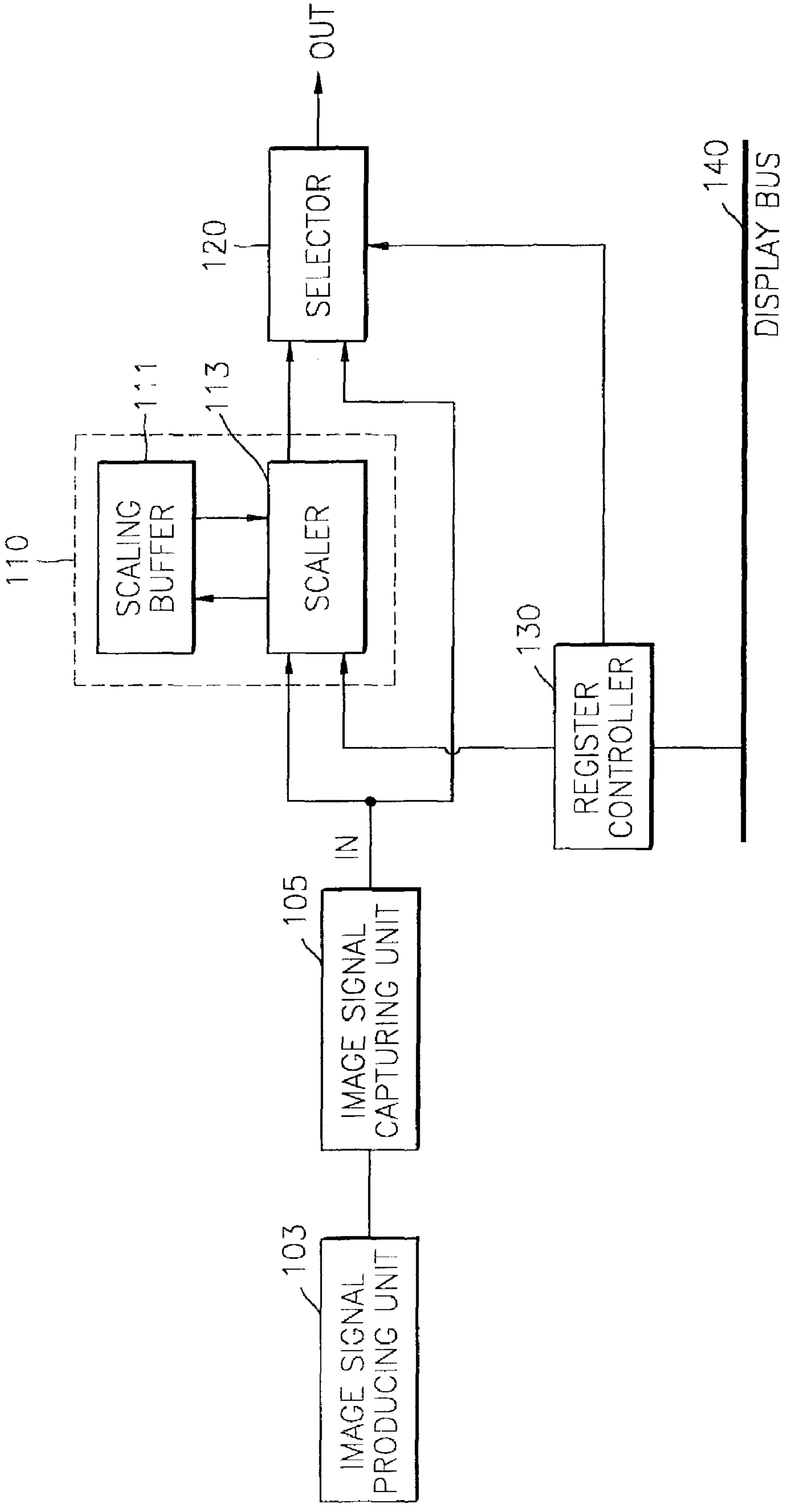
FIG. 1 is a block diagram of an apparatus for selecting an image signal to be displayed, according to a first embodiment of the present invention.

The present invention will now be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. The same reference numerals appearing in different drawings represent the same element.

First, an apparatus for selecting an image signal to be displayed, according to a first embodiment of the present invention, will be described with reference to FIGS. 1 and 7.

FIG. 1 is a block diagram of an apparatus for selecting an image signal to be displayed, according to a first embodiment of the present invention. Referring to FIG. 1, the apparatus includes an image size converter 110 for changing the size of an image signal, a selector 120, a register controller 130, and a display bus 140. The image size converter 110 includes a scaling buffer 111 and a scaler 113.

The image size converter 110 receives a first image signal that is input via an input terminal IN in units of frames. The first image signal is obtained by capturing an image signal generated by an image signal production unit 103, such as a charge-coupled device (CCD) camera, in units of frames. To capture an image signal generated by a CCD camera in units of frames, an additional image signal capturing unit 105 may be connected to an output terminal of the camera to produce the first image signal and input it to the image size converter 110. In this case, the image signal capturing unit 105 may capture frames either continuously or intermittently. Whether an image is captured continuously or intermittently is determined in response to a control signal output from the register controller 130.

An image signal output from a camera can be of various sizes, e.g., 720×480, which is the size of a SD-rank image, and 800×600, which is the super video graphics array (SVGA) standard. Also, a color signal may have various formats, for example, Y:Cb:Cr=4:2:2 or 4:2:0. For convenience, in the first embodiment, it is assumed that the size of an image signal is 720×480 and a color signal has the format Y:Cb:Cr=4:2:2.

The size of the first image signal input to the scaler 113 of the image size converter 110 via the input terminal IN is changed to be properly compressed by an encoder (not shown). Here, the size to which the original size of the first image signal is changed depends on a compression method the encoder adopts. For instance, the first image signal can be downscaled to have a size of 352×288, which is a common intermediate format (CIF), or a size of 176×144, which is a quarter common intermediate format (QCIF). The color format of the first input signal can also be changed. For example, the color format ratio of the first image signal may be changed from 4:2:2 to 4:2:0. Meanwhile, the first image signal may not only be downscaled to reduce its size but may also be upscaled to increase its size. The size to which the first image signal is resealed is determined in response to a control signal generated by the register controller 130.

The scaling buffer 111 is a memory unit that buffers an image signal to change the size of the image signal. The first image signal is stored in the scaling buffer 111 and downsampled or up-sampled by the scaler 113. As a result, the size of the first image signal is changed and the changed first image signal is output as a second image signal to the selector 120.

The selector 120 receives the second image signal from the image size converter 110 together with the first image signal from the input terminal IN, and selects one as a signal to be displayed on a display unit (not shown). This selection is made in response to a control signal output from the register controller 130. The selector 120 may be a multiplexer.

The register controller 130 receives data containing various control commands, which are stored in a register of a central processing unit (CPU) (not shown), from the CPU via the display bus 140. The received data is changed into a control signal for controlling the operation of the scaler 113 and the selector 120 and input to each component.

Figure 7:
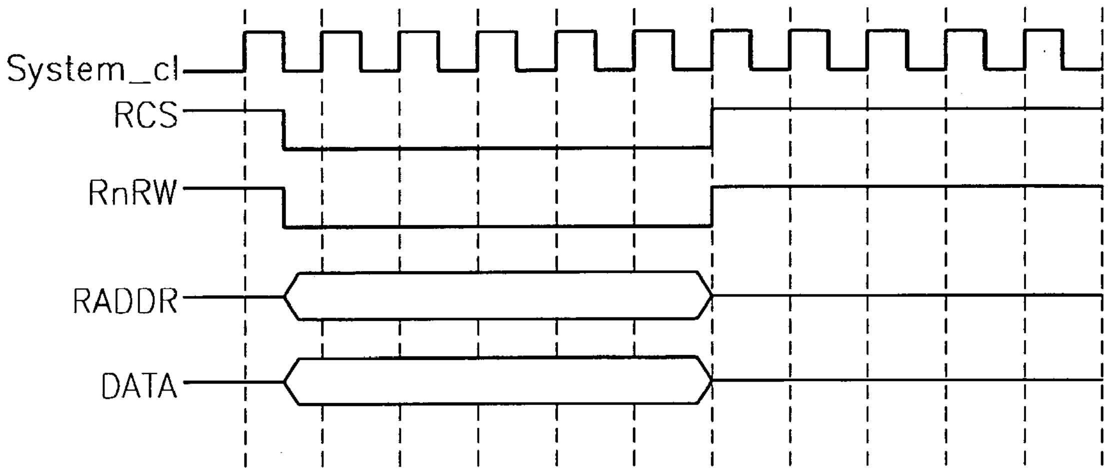
FIG. 7 is a timing diagram of register interface signals generated by a register controller illustrated in FIG. 1.

FIG. 7 is a timing diagram of register interface signals generated by the register controller 130 of FIG. 1. Here, System_cl denotes a system clock, and RCS denotes a register chip select (RCS) signal that indicates which register of the CPU is selected. RnRW is an abbreviation for Register negative Read/Write that denotes a signal commanding reading or writing of data when a negative signal is input. RADDR is an abbreviation for Register ADDRess that indicates a specific address of a selected register. Data refers to data of an address indicated by RADDR.

Meanwhile, the display bus 140 of FIG. 1 is a transmission bus for display data. In particular, in the first embodiment of the present invention, the display bus 140 may be either an additional bus only for display data, or a system bus that also acts as a data transmission bus for the encoding of input image data.

Figure 2:
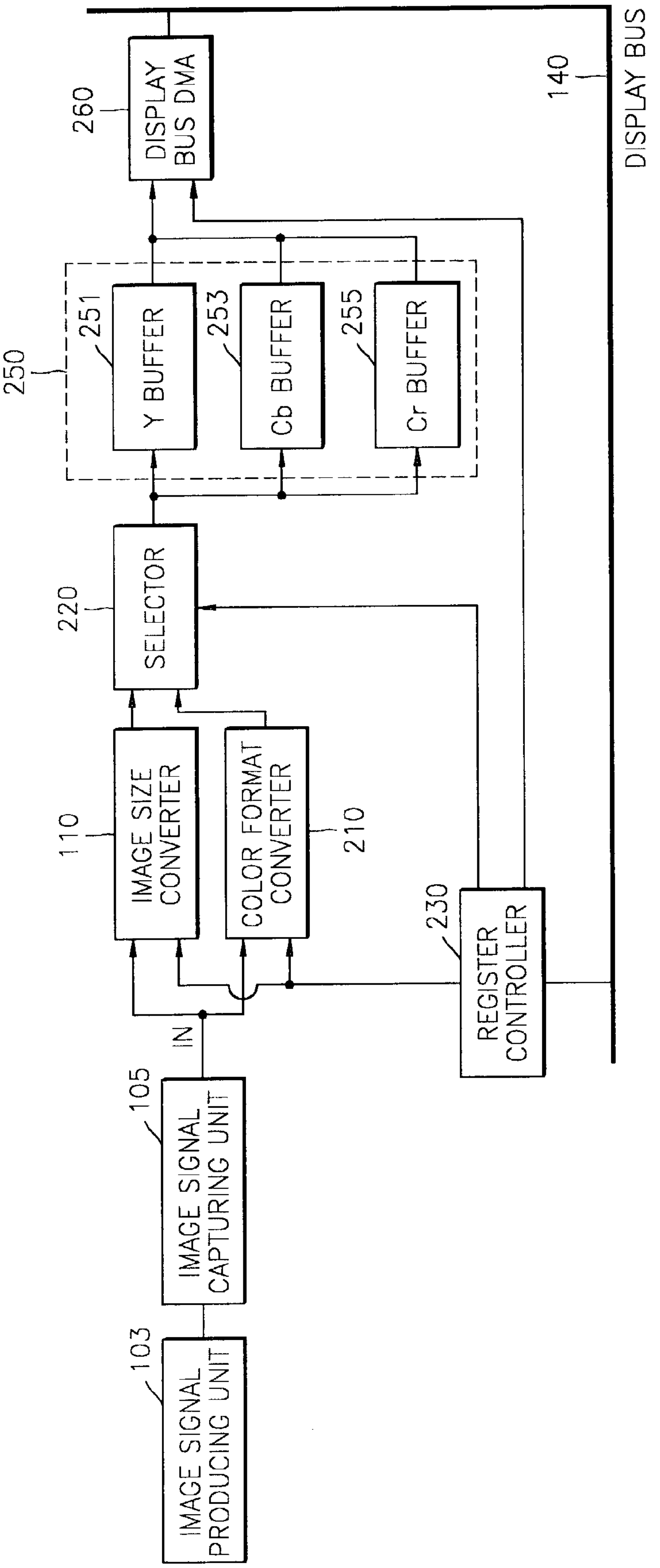
FIG. 2 is a block diagram of an apparatus for selecting an image signal to be displayed, according to a second embodiment of the present invention.

FIG. 2 is a block diagram of a selective image signal reproducing apparatus according to a second embodiment of the present invention. The apparatus includes an image size converter 110 for changing the size of an image signal, a color format converter 210 for converting the format of a color signal, a selector 220, a register controller 230, a display bus buffer 250, a display bus direct memory access (DMA) unit 260, and a display bus 140. The display bus buffer 250 includes a Y buffer 251, a Cb buffer 253, and a Cr buffer 255.

Here, it is assumed, for convenience, that the size of an image signal input via an input terminal IN is 720×480, and a color signal has a format ratio of 4:2:2, as in the first embodiment. The image size converter 110 is the same as in the first embodiment described with reference to FIG. 1, and therefore, its description will be omitted here. Also, here, as explained with reference to FIG. 1, an image signal input via the input terminal IN and an image signal output from the image size converter 110 are referred to as a first image signal and a second image signal, respectively.

The color format converter 210 receives the first image signal via the input terminal IN, converts the format of the first image signal, for example, from a ratio of 4:2:2 to a ratio of 4:2:0, and outputs the result as a third image signal. Conversion of a color signal is one step of preprocessing. A color format into which the input first image signal is to be converted is determined in response to a control signal output from the register controller 230.

The selector 220 receives the second image signal and the third image signal from the image size converter 110 and the color format converter 210, respectively, and then selects one of these signals to be displayed on a display unit (not shown). This selection is made in response to a control signal output from the register controller 230.

The display bus buffer 250 receives the second or third image signal output from the selector 220, and buffers the received signal to be displayed on the display unit by dividing the received signal into Y, Cb, and Cr signals and storing these signals in the Y buffer 251, the Cb buffer 253, and the Cr buffer 255, respectively. Each of these buffers includes at least two memory units (not shown). These memory units are ping pong memory units in which data is stored in one memory unit while data stored in another memory unit is transmitted to a bus. The capacity of each memory unit is sufficient to store all pixels in the horizontal direction of a frame image of the larger one of the second and third image signals so as to transmit data, in burst format, to the display bus 140. For instance, if the display bus 140 is a 32-bit bus, the length of a burst is also 32 bits. In the transmission of data in burst format to the display bus 140, it is understood that 32-bit bursts are not transmitted one at a time from each buffer, but several at a time from each buffer.

The display bus DMA unit 260 transmits data stored in the Y buffer 251, the Cb buffer 253 and the Cr buffer 255 of the display bus buffer 250 directly to a main memory unit (not shown) via the display bus 140. Here, DMA (Direct Memory Access) indicates a computer bus function of transmitting data directly to a mother board or the like of a computer from peripheral devices, such as a hard disc drive, attached to the computer. During the transmission of data, a microprocessor does not operate, thereby increasing the overall system operating efficiency.

As mentioned above, the display bus DMA unit 260 reads data from the respective buffers and transmits the data in burst format. In this case, the number of bursts to be transmitted at once is determined in response to a control signal output from the register controller 230. Alternatively, the number of bursts may be predetermined and set in the display DMA unit 260.

Figure 8:
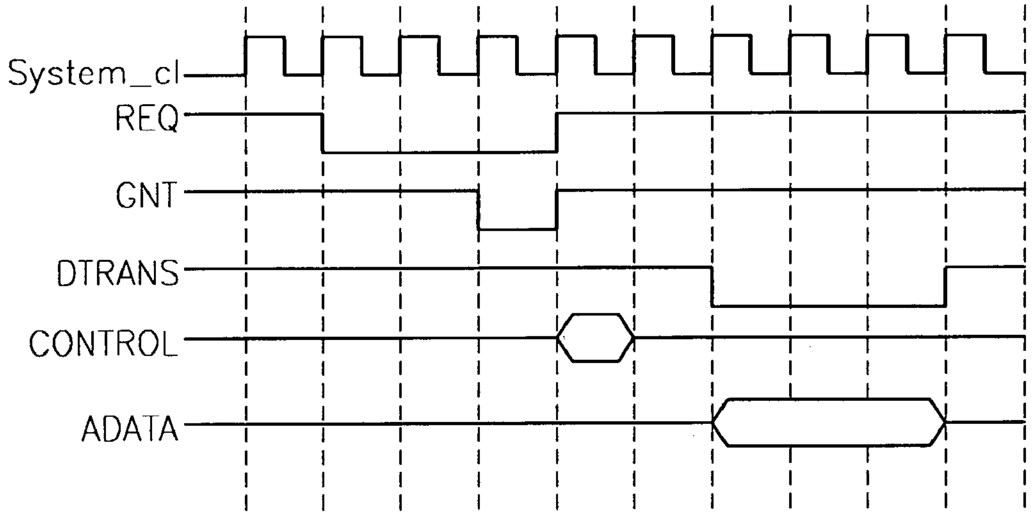
FIG. 8 is a timing diagram of interface signals generated by a display bus direct memory access (DMA) unit illustrated in FIG. 2.

FIG. 8 is a timing diagram of interface signals output from the display bus DMS unit 260. Here, REQ denotes a signal requesting data transmission to the display bus 140, GNT denotes a signal acknowledging transmission of data in response to the signal REQ, DTRANS denotes a data transmission signal, CONTROL denotes address information regarding data to be transmitted, and ADATA denotes data to be transmitted.

The register controller 230 receives data that contains various control commands or the like, stored in a register of a CPU (not shown), from the CPU via the display bus 140. Next, the register controller 230 produces control signals that are to be input to the image size converter 110, the color format converter 210, the selector 220, and the display bus DMA unit 260 to control the operation of each component.

Hereinafter, an apparatus for selecting an image signal to be displayed, using a double bus structure, according to a preferred embodiment of the present invention, will be described with reference to FIG. 3.

Figure 3:
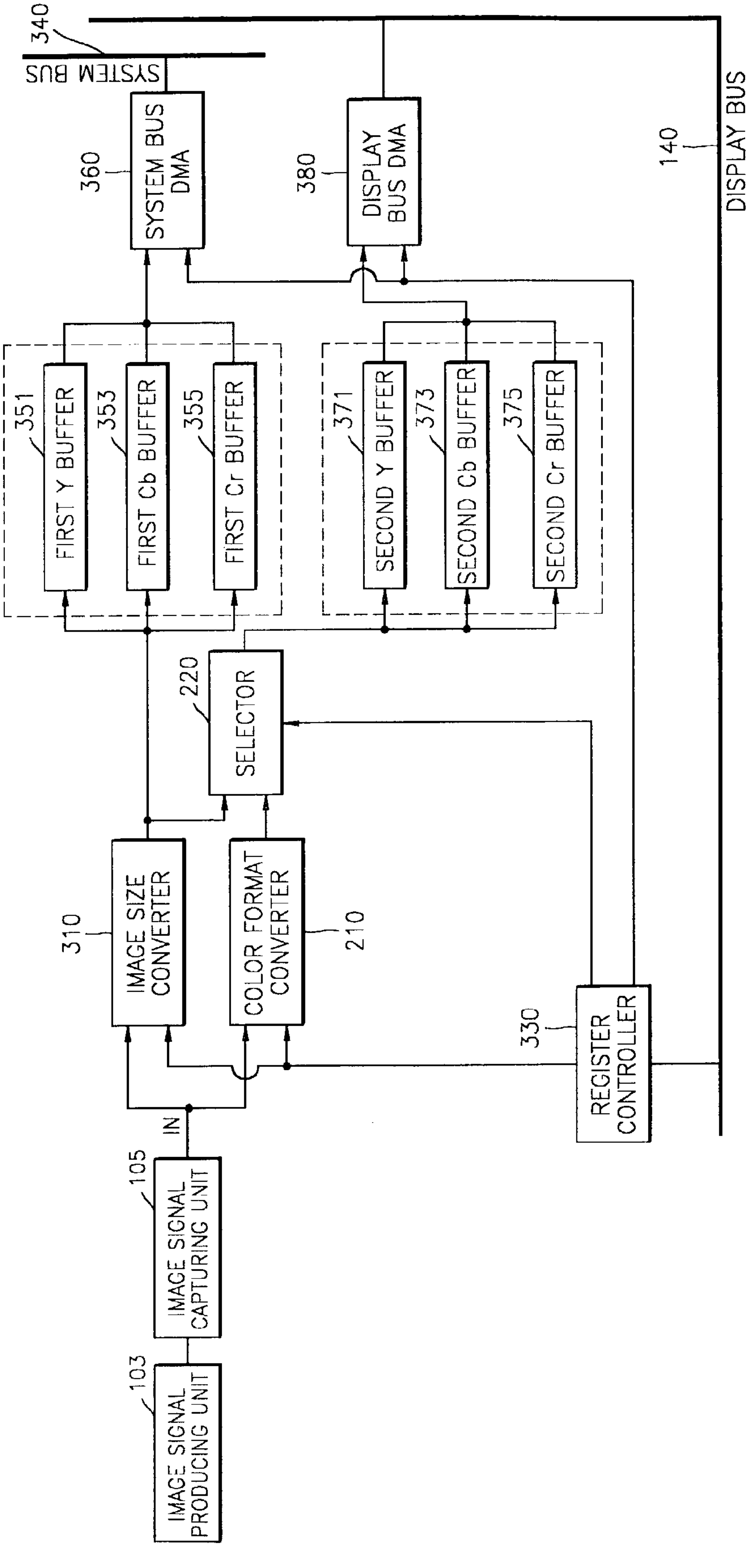
FIG. 3 is a block diagram of an apparatus, having a double bus structure, for selecting an image signal to be displayed, according to the present invention.

FIG. 3 is a block diagram of an apparatus, with a double bus structure, for selecting an image signal to be displayed, according to a preferred embodiment of the present invention. The apparatus includes an image size converter 310 for changing the size of an image signal, a color format converter 210 for converting the format of a color signal, a selector 220, a register controller 330, a display bus buffer 370, a display bus DMA unit 380, a system bus buffer 350, a system bus DMA unit 360, a display bus 140, and a system bus 340. The system bus buffer 350 includes a first Y buffer 351, a first Cb buffer 353, and a first Cr buffer 355. The display bus buffer 370 includes a second Y buffer 371, a second Cb buffer 373, and a second Cr buffer 375.

In this embodiment, it is assumed that the size of an image signal input from an input terminal IN is 720×480 and a color signal has a format ratio of 4:2:2, as in the apparatuses of FIGS. 1 and 2. Also, as described with reference to FIG. 1, a signal input from an input terminal IN is referred to as a first image signal.

The operation of the image size converter 310 is almost the same as that of the image size converter 110 illustrated in FIG. 1. Also, signals input to the image size converter 310 are also the same as those input to the image size converter 110. However, the image size converter 310 is different from the image size converter 110 in that it outputs a second image signal both to the selector 220 and to the system bus buffer 350.

The system bus buffer 350 receives the second image signal from the image size converter 310, and buffers the second image signal by dividing it into a Y signal, a Cb signal, and a Cr signal and storing these signals in the first Y buffer 351, the first Cb buffer 353, and the first Cr buffer 355, respectively. Data stored in the respective buffers is sequentially transmitted to the system bus DMA unit 360 and the system bus 340 and input to an encoder (not shown) to be compressed.

The system bus DMA unit 360 reads data from the first Y buffer 351, the first Cb buffer 353, and the first Cr buffer 355 and transmits the read data, in burst format, to the system bus 340, just as the display bus DMA unit 260 of FIG. 2 does. The number of bursts to be transmitted at once is determined in response to a control signal output from the register controller 330. Alternatively, the number of bursts may be predetermined and set in the system bus DMA unit 360.

The system bus 340 transmits image data to the encoder that performs data compression. Conventionally, display data as well as image data is transmitted to the encoder via a system bus. However, when the size of image data increases, it becomes difficult to process input data using an apparatus for selecting an image signal to be displayed, using a single bus structure. This is the reason for development of an apparatus for selecting a desired image signal having a double bus structure consisting of a system bus and a display bus.

The operation of the register controller 330 is the same as that of the register controller 230 of FIG. 2. A control signal for determining the number of bursts to be transmitted, output from the register controller 330 of FIG. 3, is input to the system bus DMA unit 360, as well as to the display bus DMA unit 380, so as to determine the number of bursts to be transmitted to the system bus 340.

Meanwhile, the operations of the color format converter 210 and the selector 220 of FIG. 3 are the same as those of the color format converter 210 and the selector 220 of FIG. 2. Also, signals input to and output from the color format converter 210 and the selector 220 of FIG. 3 are the same as the signals input to and output from the color format converter 210 and the selector 220 of FIG. 2. Further, the operations of the second Y buffer 371, the second Cb buffer 373, and the second Cr buffer 375, which constitute the display bus buffer 370, are the same as those of the Y buffer 251, the Cb buffer 253, and the Cr buffer 255. Lastly, the display bus DMA unit 380 is the same as the display bus DMA unit 260 of FIG. 2.

A method for selecting an image signal to be displayed, according to a preferred embodiment of the present invention, will now be described with reference to FIGS. 1 and 4.

Figure 4:
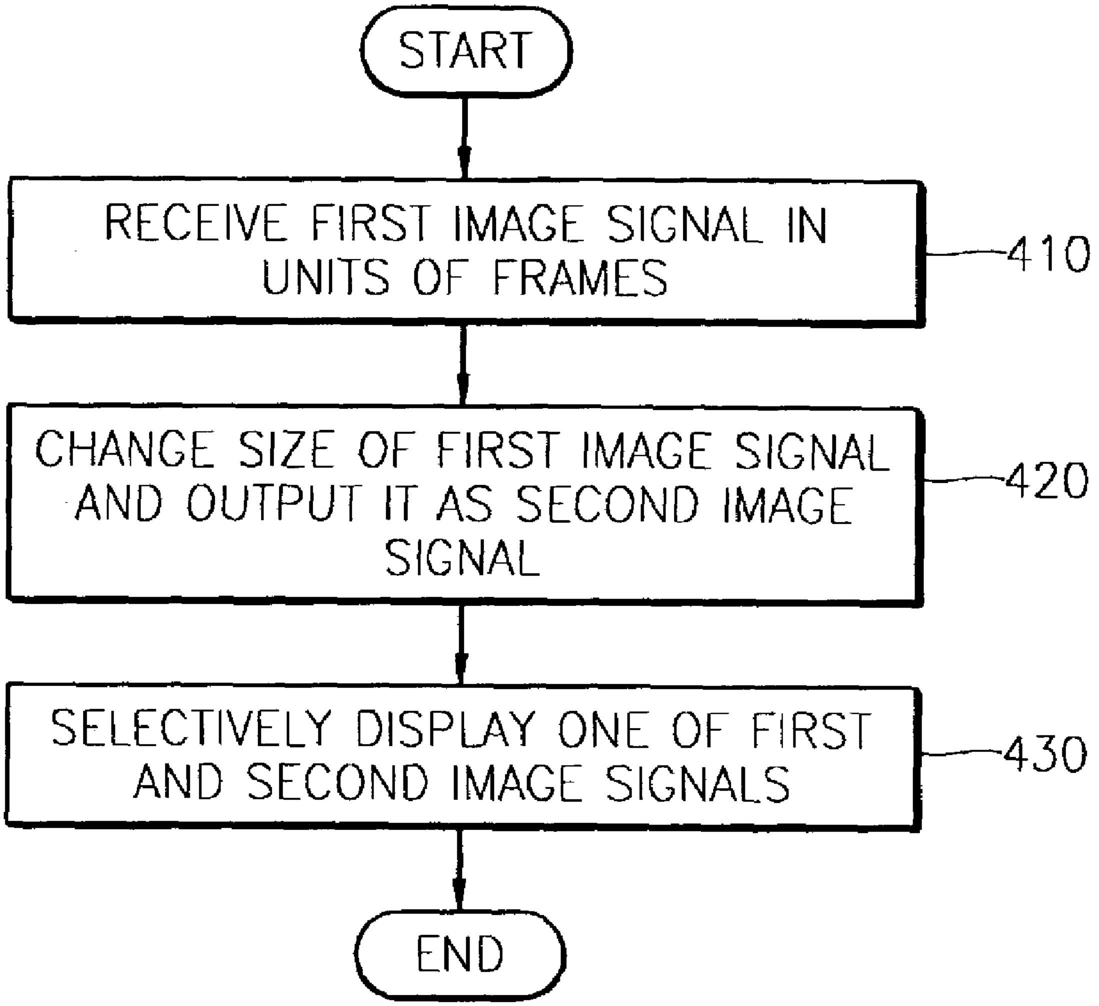
FIG. 4 is a flow chart illustrating a method for selecting an image signal to be displayed, performed by the selective image signal reproducing apparatus of FIG. 1.

FIG. 4 is a flow chart illustrating a method for selecting an image signal to be displayed, according to the present invention, performed by the apparatus of FIG. 1. First, the image size converter 110 receives a first image signal of a predetermined size that is input in units of frames in step 410. After step 410, the image size converter 110 changes the size of the input first image signal and outputs the result as a second image signal in step 420. After step 420, the selector 120 receives the second image signal from the image size converter 110 and the first image signal from the input terminal IN, and selects one of the first and second image signals as a signal to be displayed on a display unit (not shown), in step 430.

A method for selecting an image signal to be displayed, according to another embodiment of the present invention, will now be described with reference to FIGS. 2 and 5.

Figure 5:
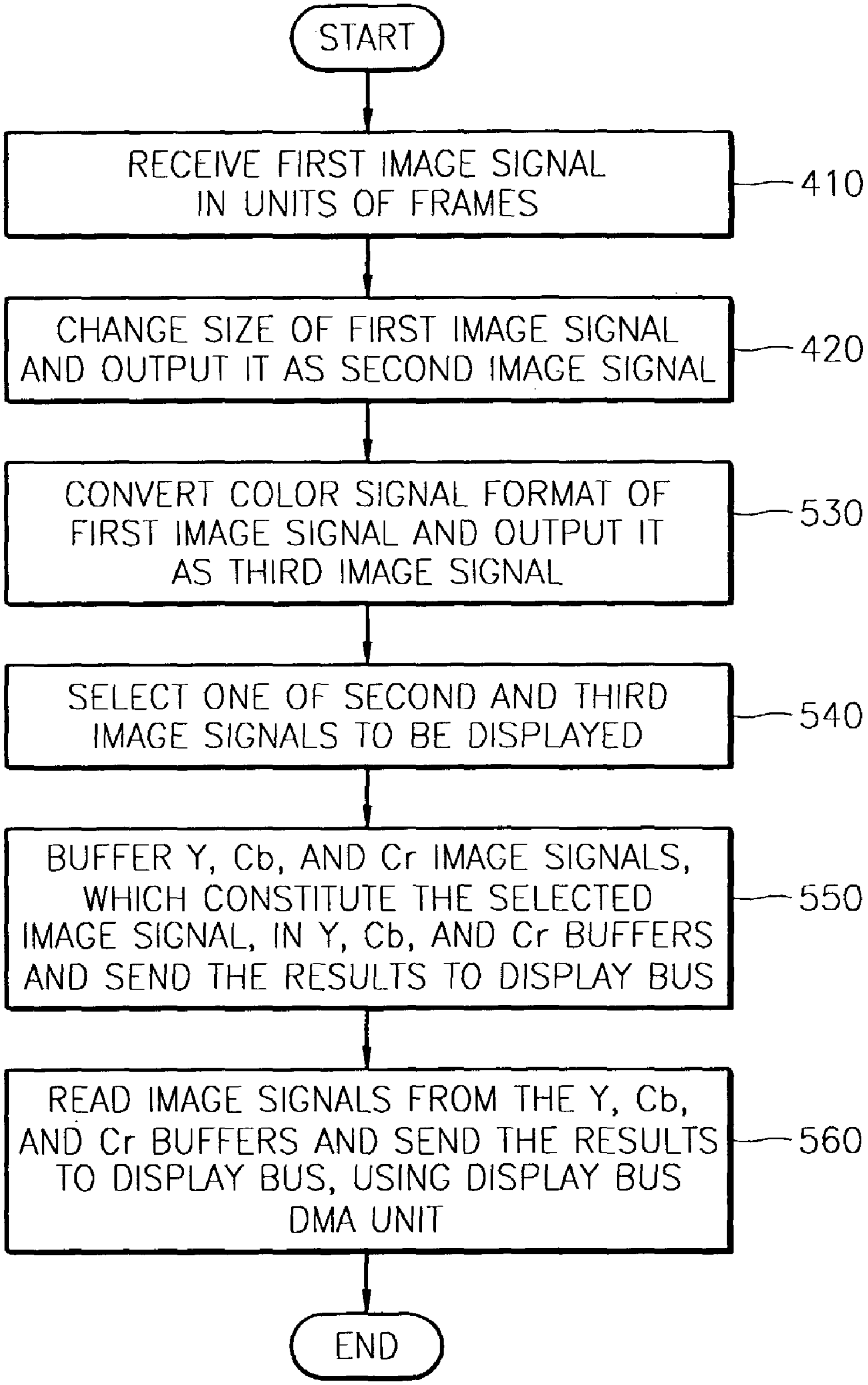
FIG. 5 is a flow chart illustrating a method for selecting an image signal to be displayed, performed by the selective image signal reproducing apparatus of FIG. 2.

FIG. 5 is a flow chart illustrating a method for selecting an image signal to be displayed, according to the present invention, performed by the apparatus of FIG. 2. Referring to FIG. 5, steps 410 and 420 are the same steps illustrated in FIG. 4. Therefore, their descriptions will be omitted here. After step 420, the color format converter 210 receives a first image signal of a predetermined color format via the input terminal IN, converts the format of the first image signal, and outputs the result as a third image signal, in step 530. After step 530, the selector 220 receives the second image signal and the third image signal from the image size converter 110 and the color format converter 210, respectively, and selects one of the second and third image signals as a signal to be displayed on a display device (not shown), in step 540. After step 540, the image signal selected by the selector 220 is input to the display bus buffer 250 to divide the selected image signal into a Y image signal, a CB image signal, and a Cr image signal and buffer these signals in the Y buffer 251, the Cb buffer 253, and the Cr buffer 255, respectively, in step 550. After step 550, the display bus DMA unit 260 reads image signals from the Y buffer 251, the Cb buffer 253, and the Cr buffer 255 and transmits the result to the display bus 140, in step 560.

A method for selecting an image signal to be displayed, performed by an apparatus for selecting a desired image signal with a double bus structure according to a preferred embodiment of the present invention, will now be described with reference to FIGS. 3 and 6.

Figure 6:
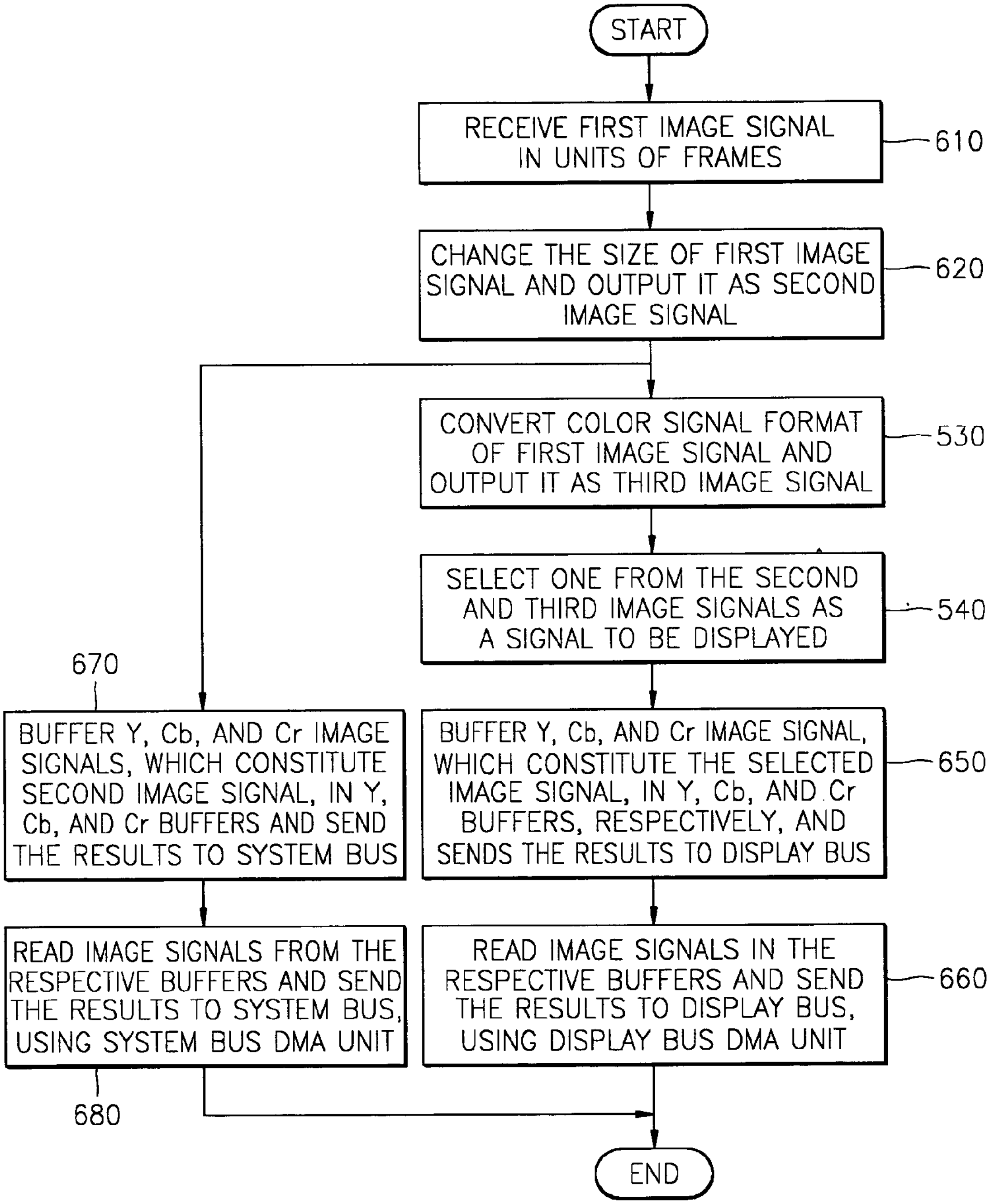
FIG. 6 is a flow chart illustrating a method for selecting an image signal to be displayed, performed by the apparatus having a double bus structure of FIG. 3.

FIG. 6 is a flow chart illustrating a method for selecting an image signal to be displayed, performed by the apparatus of FIG. 3. First, the image size converter 310 receives a first image signal that is input in units of frames in step 610. After step 610, the image size converter 310 changes the size of the first image signal and outputs the result as a second image signal in step 620. After step 620, steps 530 and 540 are performed. Since steps 530 and 540 are the same steps shown in FIG. 5, their descriptions will be omitted here. After step 540, an image signal selected by the selector 220 is input to the display bus buffer 370, divided into a Y image signal, a Cb image signal, and a Cr image signal, and buffered by the second Y buffer 371, the second Cb buffer 373, and the second Cr buffer 375, in step 650. After step 650, the display bus DMA unit 380 reads image signals from the second Y buffer 371, the second Cb buffer 373, and the second Cr buffer 375, and sends the result to the display bus 140, in step 660. Going back to right after step 620, the second image signal output from the image size converter 310 is input to the system bus buffer 350, divided into a Y image signal, a Cb image signal, and a Cr image signal, and buffered by the first Y buffer 351, the first Cb buffer 353, and the first Cr buffer 355, respectively, in step 670. After step 670, the system bus DMA unit 360 reads image signals from the first Y buffer 351, the first Cb buffer 353, and the first Cr buffer 355, and sends the result to the system bus 340, in step 680.

The present invention can be embodied as a computer readable code stored on a computer readable medium. Here, the computer readable medium may be any kind, such as a read-only memory (ROM), a random access memory (RAM), a compact disc (CD)-ROM, a magnetic tape, a floppy disk, an optical data storage device, and so on. Also, the computer readable medium may be carrier waves that transmit data over the Internet, for example. The computer readable recording medium can also be distributed throughout computer systems connected to a network, and stored and implemented in a distributed fashion.

As described above, with an apparatus and method for selecting an image signal to be displayed, according to the present invention, it is possible to select one of an image signal input from an image signal inputting apparatus such as a camera and an image signal obtained by changing the size of the image signal input from the image signal inputting apparatus. Accordingly, using such an apparatus and method, a user can selectively reproduce a high-definition image and a low-definition image, thereby increasing the functionality of a system.

What is claimed is:

1. An apparatus for selecting an image to be displayed, comprising:
- an image size converter for changing the size of a first image signal and outputting the result as a second image signal;
- a selector for receiving the first and second image signals and selectively outputting one of the first and second image signals in response to a first control signal;
- a display bus buffer including a Y buffer, a Cb buffer, and a Cr buffer for receiving the image signal output from the selector and buffering a Y image signal, a Cb image signal, and a Cr image signal, which constitute the output image signal, respectively;
- a display bus for transmitting the image signal to a display device; and
- a display bus direct memory access (DMA) unit for reading the image signal from the display bus buffer and sending the result to the display bus.

2. The apparatus of claim 1, further comprising:
- an image signal producing unit for photographing a target image, producing an image signal from the photographed image, and outputting the produced image signal; and
- an image signal capturing unit for capturing the image signal from the image signal producing unit in units of frames and outputting the result as the first image signal.

3. The apparatus of claim 1, wherein each of the Y buffer, the Cb buffer, and the Cr buffer includes at least two memory units, and the capacity of each memory unit is sufficient to store all pixels in the horizontal direction of a frame image of the larger one of the first and second image signals.

4. The apparatus of claim 1, wherein the display bus DMA unit receives a second control signal, reads data of a certain length from the display bus buffer in response to the second control signal, and transmits the result to the display bus.

5. The apparatus of claim 1, wherein the display bus DMA unit reads data of a predetermined length from the display bus buffer and transmits the result to the display bus.

6. The apparatus of claim 1, further comprising a color format converter for receiving the first image signal of a first color signal format, converting the first color signal format of the first image signal into a second color signal format, and outputting the result to the selector.

7. The apparatus of claim 6, wherein the first color signal format is at a ratio of Y:Cb:Cr=4:2:2 and the second color signal format is at a ratio of Y:Cb:Cr=4:2:0.

8. An apparatus for selecting an image signal having a double bus structure, the apparatus comprising:

an image size converter for changing the size of a first image signal and outputting the result as a second image signal, the first image signal being an input image signal of a certain size;

a selector for receiving the first and second image signals and selectively outputting one of the first and second image signals in response to a first control signal;

a system bus buffer including a first Y buffer, a first Cb buffer, and a first Cr buffer for receiving the second image signal and buffering a Y image signal, a Cb image signal, and a Cr image signal, which constitute the second image signal, respectively;

a system bus for sending an input image signal to an image encoding unit;

a system bus DMA unit for reading an image signal output from the system bus buffer and sending the result to the system bus;

a display bus buffer including a second Y buffer, a second Cb buffer, and a second Cr buffer, the second Y, Cb, and Cr buffers for receiving the image signal output from the selector and buffering a Y image signal, a Cb image signal, and a Cr image signal, which constitute the image signal output from the selector, respectively;

a display bus for sending an input image signal to an image encoding unit; and a display bus DMA unit for reading an image signal output from the display bus buffer and sending the result to the display bus.

9. The apparatus of claim 8, further comprising:

an image signal producing unit for producing an image signal by photographing a target image, and outputting the produced image signal; and an image signal capturing unit for capturing the image signal output from image signal producing unit in units of frames and outputting the result as the first image signal.

10. The apparatus of claim 8, wherein each of the first Y, Cb, and Cr buffers includes at least two memory units, and the capacity of each memory unit is sufficient to store all pixels in the horizontal direction of a frame image of the second image signal.

11. The apparatus of claim 8, wherein each of the second Y, Cb, and Cr buffers includes at least two memory units, and the capacity of each memory unit is sufficient to store all pixels in the horizontal direction of a frame image contained in the larger one of the first and second image signals.

12. The apparatus of claim 8, wherein the display bus DMA unit and the system bus DMA unit read data of certain lengths from the display bus buffer and the system bus buffer, respectively, in response to a second control signal, and transmit the results to the display bus and the system bus, respectively.

13. The apparatus of claim 8, wherein the display bus DMA unit and the system bus DMA unit read data of predetermined lengths from the display bus buffer and the system bus buffer, respectively, and transmit the results to the display bus and the system bus, respectively.

14. The apparatus of claim 8, further comprising a color format converter for receiving the first image signal of a first color signal format, converting the first color signal format into a second color signal format, and outputting the result to the selector.

15. The apparatus of claim 14, wherein the first color signal format is at a ratio of Y:Cb:Cr=4:2:2, and the second color signal format is at a ratio of Y:Cb:Cr=4:2:0.

16. A method for selecting an image signal to be displayed, comprising:

(a) changing the size of a first image signal and outputting the result as a second image signal, the first image signal being an input image signal;

(b) selecting one of the first and second image signals;

(c) receiving the first or second image signal selected in (b) and buffering a Y image signal, a Cb image signal, and a Cr image signal, which constitute the selected image signal, in a Y buffer, a Cb buffer, and a Cr buffer, respectively; and (d) reading an image signal from the Y, Cb, and Cr buffers and sending the results to a display bus using a display bus DMA unit.

17. The method of claim 16, before (a) further comprising:

(e) photographing a target image, producing an image signal from the photographed image, and outputting the image signal; and (f) capturing the produced image signal in units of frames and outputting the result as the first image signal.

18. The method of claim 16, wherein each of the Y, Cb, and Cr buffers includes at least two memory units, and the capacity of each memory unit is sufficient to store all pixels in the horizontal direction of a frame image of the larger one of the first and second image signals.

19. The method of claim 16, wherein the display bus DMA unit reads data of certain lengths from the Y, Cb, and Cr buffers in response to a second control signal and transmits the results to the display bus.

20. The method of claim 16, wherein the display bus DMA unit reads data of predetermined lengths from the Y, Cb, and Cr buffers and sends the results to the display bus.

21. The method of claim 16, before (b) further comprising:

(g) converting a first color signal format of the first image signal into a second color signal format, so that the first image signal in (b) has the second color signal format.

22. The method of claim 21, wherein the first color signal format is at a ratio of Y:Cb:Cr=4:2:2, and the second color signal format is at a ratio of Y:Cb:Cr=4:2:0.

23. A method for selecting an image signal to be displayed, performed by an apparatus for selecting a desired image signal having a double bus structure, the method comprising:

(a) changing the size of a first image signal and outputting the result as a second image signal, the first image signal being an input image signal;

(b) selecting one of the first and second image signals;

(c) receiving the second image signal and buffering a Y image signal, a Cb image signal, and a Cr image signal, which constitute the second image signal, in a first Y buffer, a first Cb buffer, and a first Cr buffer, respectively;

(d) reading image signals from the first Y, Cb, and Cr buffers and sending the results to a system bus, using a system bus DMA unit;

(e) receiving the first or second image signal selected in (b) and buffering a Y image signal, a Cb image signal, and a Cr image signal, which constitute the selected first or second image signal in a second Y buffer, a second Cb buffer, and a second Cr buffer, respectively; and (f) reading image signals from the second Y, Cb, and Cr buffers and sending the results to a display bus, using a display bus DMA unit.

24. The method of claim 23, before (a) further comprising:

(g) photographing a target image, producing an image signal from the photographed image, and outputting the image signal; and (h) capturing the image signal in one frame unit and outputting the result as the first image signal.

25. The method of claim 23, wherein each of the first Y, Cb, and Cr buffers includes at least two memory units, and the capacity of each memory unit is sufficient to store all pixels in the horizontal direction of a frame image of the second image signal.

26. The method of claim 23, wherein each of the second Y, Cb, and Cr buffers includes at least two memory units, and the capacity of each memory unit is sufficient to store all pixels in the horizontal direction of a frame image of the larger one of the first and second image signals.

27. The method of claim 23, wherein either the system bus DMA unit reads data of certain lengths from the first Y, Cb, and Cr buffers and sends the results to the system bus, or the display bus DMA unit reads data of certain lengths from the second Y, Cb, and Cr buffers and sends the results to the display bus, in response to an input second control signal.

28. The method of claim 23, wherein either the system bus DMA unit reads data of predetermined lengths from the first Y, Cb, and Cr buffers and sends the results to the system bus, or the display bus DMA unit reads data of predetermined lengths from the second Y, Cb, and Cr buffers and sends the results to the display bus.

29. The method of claim 23, before (b) further comprising:

(i) converting a first color signal format of the first image signal into a second color signal format, so that the first image signal in (b) has the second color signal format.

30. The method of claim 29, wherein the first color signal format is at a ratio of Y:Cb:Cr=4:2:2, and the second color signal format is at a ratio of 4:2:0.

31. A computer readable recording medium storing a program for executing a method for selecting an image signal to be displayed, the method comprising:

(a) changing the size of a first image signal and outputting the result as a second image signal, the first image signal being an input image signal;

(b) selecting one of the first and second image signals;

(c) receiving the first or second image signal selected in (b) and buffering a Y image signal, a Cb image signal, and a Cr image signal, which constitute the selected image signal, in a Y buffer, a Cb buffer, and a Cr buffer, respectively; and (d) reading an image signal from the Y, Cb, and Cr buffers and sending the results to a display bus using a display bus DMA unit.

32. A computer readable recording medium storing a program for executing a method of selecting a desired image signal performed by an apparatus for selecting an image signal having a double bus structure, the method comprising:

(a) changing the size of a first image signal and outputting the result as a second image signal, the first image signal being an input image signal;

(b) selecting one of the first and second image signals;

(c) receiving the second image signal and buffering a Y image signal, a Cb image signal, and a Cr image signal, which constitute the second image signal, in a first Y buffer, a first Cb buffer, and a first Cr buffer, respectively;

(d) reading image signals from the first Y, Cb, and Cr buffers and sending the results to a system bus, using a system bus DMA unit;

(e) receiving the first or second image signal selected in (b) and buffering an Y image signal, a Cb image signal, and a Cr image signal, which constitute the selected first or second image signal, in a second Y buffer, a second Cr buffer, and a second Cb buffer, respectively; and (f) reading image signals from the second Y, Cr, and Cb buffers and sending the results to a display bus, using a display bus DMA unit.

* * * * *